United States Patent
Balasubramaniyan et al.

(10) Patent No.: US 11,899,743 B2
(45) Date of Patent: Feb. 13, 2024

(54) RECONFIGURABLE PARALLEL 3-DIMENSIONAL CONVOLUTION CLUSTER ENGINE

(71) Applicant: HCL TECHNOLOGIES LIMITED, New Delhi (IN)

(72) Inventors: Prasanna Venkatesh Balasubramaniyan, Chennai (IN); Sainarayanan Gopalakrishnan, Chennai (IN); Gunamani Rajagopal, Chennai (IN)

(73) Assignee: HCL TECHNOLOGIES LIMITED, New Delhi (IN)

( * ) Notice: Subject to any disclaimer, the term of this patent is extended or adjusted under 35 U.S.C. 154(b) by 351 days.

(21) Appl. No.: 17/136,370

(22) Filed: Dec. 29, 2020

(65) Prior Publication Data
US 2022/0012513 A1 Jan. 13, 2022

(30) Foreign Application Priority Data
Jul. 9, 2020 (IN) .............................. 202011029150

(51) Int. Cl.
*G06F 18/40* (2023.01)
*G06F 17/15* (2006.01)
(Continued)

(52) U.S. Cl.
CPC .......... *G06F 17/153* (2013.01); *G06F 18/213* (2023.01); *G06F 18/40* (2023.01);
(Continued)

(58) Field of Classification Search
CPC ........ G06V 10/95; G06V 10/40; G06V 10/98; G06K 9/6232; G06K 9/6253; G06N 3/0454; G06N 3/063; G06T 1/60; G06F 17/153
See application file for complete search history.

(56) References Cited

U.S. PATENT DOCUMENTS

| 7,036,059 B1 | 4/2006 | Carmichael et al. |
| 2016/0379109 A1 | 12/2016 | Chung et al. |
| 2020/0341758 A1 | 10/2020 | Wan et al. |

FOREIGN PATENT DOCUMENTS

| CN | 103019656 A | 4/2013 |
| WO | 2019127731 A1 | 7/2019 |

OTHER PUBLICATIONS

Tu, Fengbin, et al. "Deep convolutional neural network architecture with reconfigurable computation patterns." IEEE Transactions on Very Large Scale Integration (VLSI) Systems 25.8 (2017): 2220-2233. (Year: 2017).*

(Continued)

*Primary Examiner* — Amandeep Saini
*Assistant Examiner* — Denise G Alfonso

(57) ABSTRACT

Disclosed is a reconfigurable parallel 3-Dimensional (3-D) convolution engine for performing 3-D Convolution and parallel feature map extraction on an image. The reconfigurable parallel 3-D convolution engine further comprises a plurality of CNN reconfigurable engines configured to perform 3-D convolution, in parallel, to process a plurality of feature maps, a kernel memory space, present in each instance of CNN reconfigurable engine, capable for holding a set of parameters associated to a network layer having each operational instance of CNN reconfigurable engine, and at least one memory controller, an Input Feature Map Memory (FMM) cluster and an Output FMM cluster.

9 Claims, 4 Drawing Sheets

(51) Int. Cl.
*G06T 1/60* (2006.01)
*G06V 10/94* (2022.01)
*G06F 18/213* (2023.01)
*G06N 3/045* (2023.01)

(52) U.S. Cl.
CPC ............... *G06N 3/045* (2023.01); *G06T 1/60* (2013.01); *G06V 10/95* (2022.01)

(56) References Cited

OTHER PUBLICATIONS

Schorn, Christoph, Andre Guntoro, and Gerd Ascheid. "Efficient on-line error detection and mitigation for deep neural network accelerators." International Conference on Computer Safety, Reliability, and Security. Springer, Cham, 2018. (Year: 2018).*

* cited by examiner

RECONFIGURABLE PARALLEL 3-DIMENSIONAL CONVOLUTION CLUSTER ENGINE

CROSS-REFERENCE TO RELATED APPLICATIONS AND PRIORITY

This patent application does not claim priority from any application. The present application claims benefit from Indian Complete Patent Application No. 202011029150 filed on 9 Jul. 2020 the entirety of which is hereby incorporated by reference.

TECHNICAL FIELD

The present subject matter described herein, in general, relates to a reconfigurable parallel 3-Dimensional (3-D) convolution cluster engine and more particularly to the reconfigurable parallel 3-Dimensional (3-D) convolution cluster engine for performing 3-D Convolution and feature map extraction on an image.

BACKGROUND

In recent times, Convolution Neural Networks (CNNs) are finding versatile application in the field of computer vision, in which many demands low power and high compute intensive. A hardware accelerated CNN engine plays a vital role while handling the massive compute intensive operations (ex: mathematical operations) along with performance vs power trade-off scenarios. Moreover, most of the Deep Neural Network (DNN) which gets deployed in the safety critical or mission critical applications like automotive, medical or aerospace needs functional safety mechanisms and diagnostics features to be incorporated at the silicon level to address the functional safety requirements defined or demanded at system level to comply with standards like ISO 26262, IEC 61508 etc.

For example, autonomous vehicles use perception algorithm to solve more real world problems using DNN. These DNN are deployed (or inferenced) using massive SOC based silicon chips. In real-time, there are probability that silicon device may get prone to Single Event Upset (SEU) and Single Event Transition (SET) faults due to radiation effects (based on the device FIT and Grade), that may lead to dangerous failure.

Thus, it becomes utmost important to develop a silicon level solution or an IP-Core to have various safety mechanism and diagnostics features incorporated in the design at various levels, to adhere the standards like ISO 26262 and Safety of The Intended Functionality (SOTF).

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to a reconfigurable parallel 3-Dimensional (3-D) convolution cluster engine and the concepts are further described below in the detailed description. This summary is not intended to identify essential features of the claimed subject matter nor is it intended for use in determining or limiting the scope of the claimed subject matter.

In one implementation, a reconfigurable parallel 3-Dimensional (3-D) convolution engine for performing 3-D Convolution and feature map extraction on an image is disclosed. The reconfigurable parallel 3-Dimensional convolution engine may comprise a plurality of CNN reconfigurable engines configured to perform 3-D convolution, in parallel, to process a plurality of feature maps. The reconfigurable parallel 3-Dimensional convolution engine may further comprise a kernel memory space, present in each instance of CNN reconfigurable engine, capable for holding a set of parameters associated to a network layer having each operational instance of CNN reconfigurable engine. The reconfigurable parallel 3-Dimensional convolution engine may further comprise at least one memory controller, an Input Feature Map Memory (FMM) cluster and an Output FMM cluster. In one aspect, the at least one memory controller, in communication with each of the plurality of CNN reconfigurable engines, may be configured to fetch Input feature map data from image data retrieved from an external memory. Upon fetching the Input feature map data, the at least one memory controller transfer the image data into one or more input line buffers, of each FMM bank, present in the Input FMM cluster, in order to extract features from the image data. Subsequent to the extraction of the features, the at least one memory controller may transfer convoluted output data, indicative of a 3-Dimensional Convolution and feature map extraction of the image, to one or more output line buffers, of the Output FMM cluster, which further relay the convoluted output data to the external memory. The reconfigurable parallel 3-Dimensional convolution engine may further comprise a flat dense computing unit configured to convert each of the plurality of feature maps into 1-Dimensional vector and thereby perform dense multiplication on 1-Dimensional vector by using filter kernels values so as to transfer the convoluted output data to the external memory.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
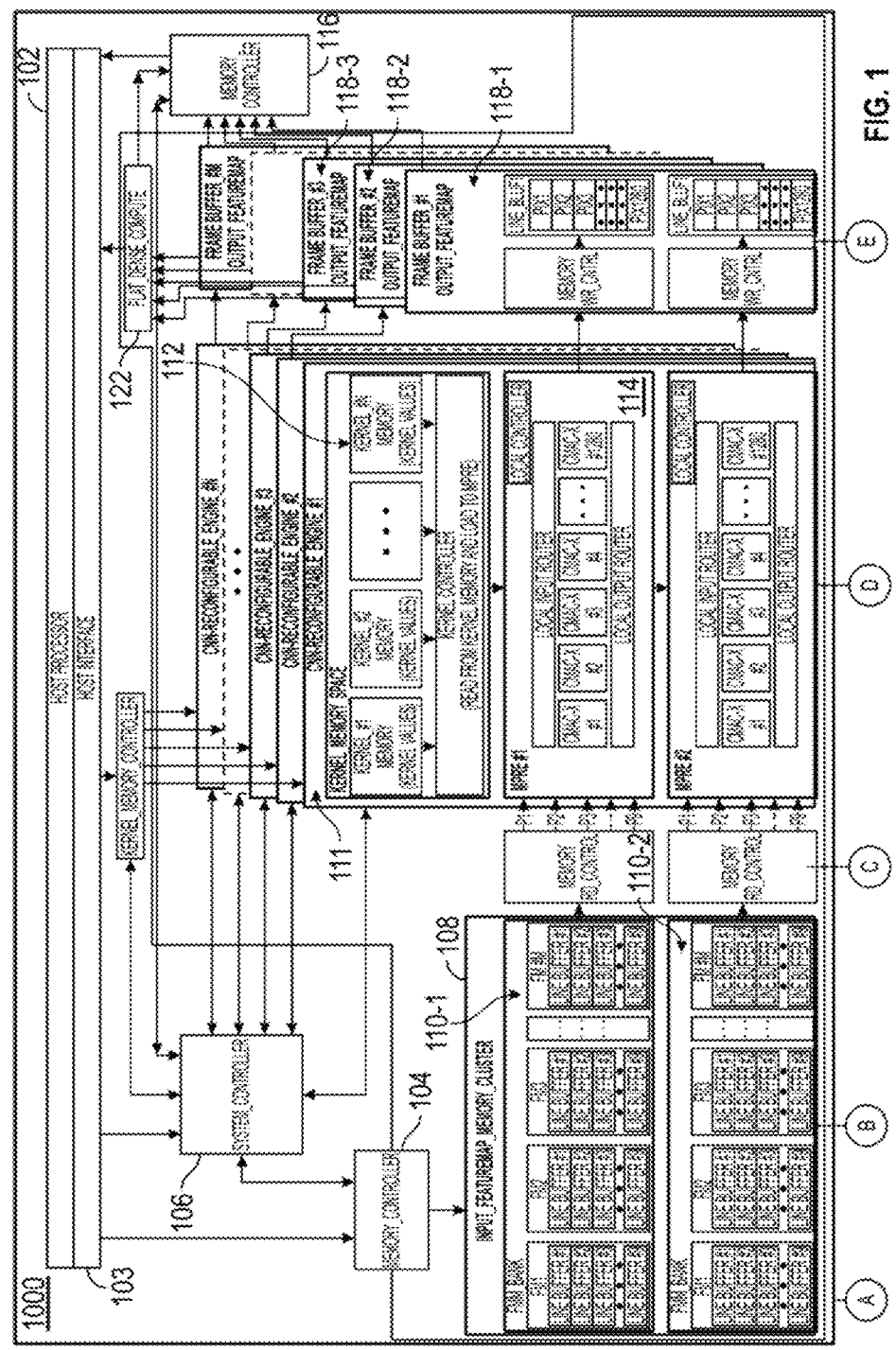
FIG. 1 illustrates a hardware implementation of a reconfigurable parallel 3-Dimensional (3-D) convolution engine in an infrastructure having one or more external components for performing 3-D Convolution and feature map extraction on an image, in accordance with an embodiment of the present subject matter.
Figure 1:
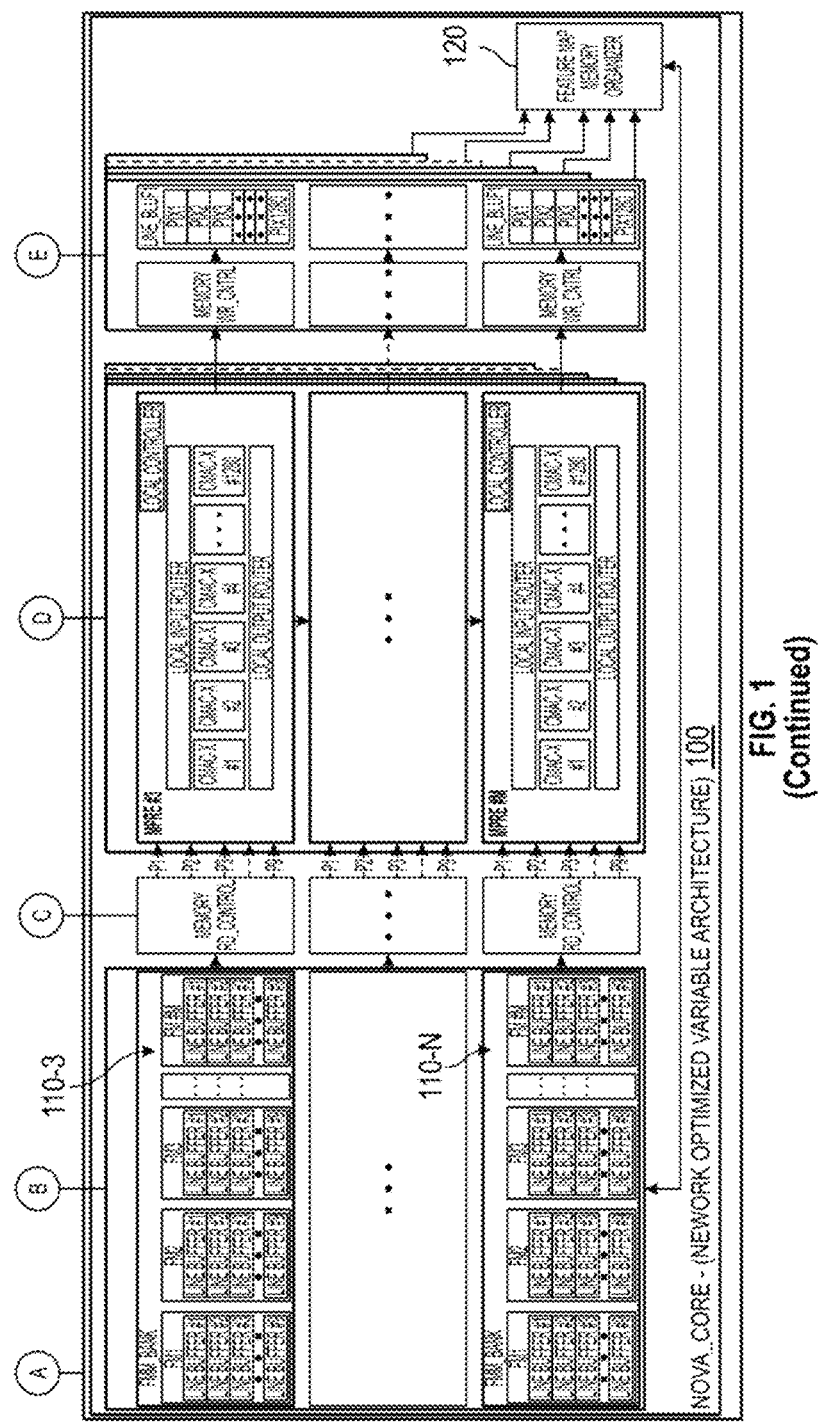

Some embodiments of this disclosure, illustrating all its features, will now be discussed in detail. The words "receiving," "determining," "allocating," "configuring," "executing," and "filtering," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention performs performing 3-D Convolution and feature map extraction on an image by using a reconfigurable parallel 3-Dimensional (3-D) convolution engine in an infrastructure having one or more external components. The reconfigurable parallel 3-D convolution engine comprises at least one memory controller, one or more input line buffers, one or more output line buffers, a kernel memory space. Further, the one or more external components may comprise a host processor. The host processor is an on-chip processor to perform task scheduling according to network architecture and parameters associated within each layer of the image. Example of the on-chip processor may include, but not limited to, a Processor Core.

The at least one memory controller, communicatively coupled with the one or more input line buffers, is configured to fetch data from an external memory and transfer into the one or more input line buffers. Example of the external memory processor may include, but not limited to, DDR Memory. The at least one memory controller may further be communicatively coupled with the one or more output line buffers is responsible for transferring convoluted output data to the external memory. It may be noted that the at least one memory controller may be an intermediate cache memory used for further processing by subsequent network layers.

In one embodiment, the one or more input line buffers and the one or more output line buffers may be configured to hold single or multiple image/feature map data. It is to be noted that handling of the image/feature map data may be scheduled by a host scheduler. In one embodiment, the host scheduler may also be referred as a host processor.

The at least one memory controller may act as configuration for the reconfigurable parallel 3-D convolution engine and other functional blocks comprising at least one memory controller and the kernel memory space. The kernel memory space and threshold register space may act as a local cache memory for holding the parameters associated to the network layer hosting the reconfigurable parallel 3-D convolution engine. It is to be noted that the reconfigurable parallel 3-D convolution engine and other functional blocks may be controlled by the host scheduler. In one implementation, the host scheduler is also configured to control operations of the set of computing blocks present inside the reconfigurable parallel 3-D convolution engine.

It may further be noted that the reconfigurable parallel 3-D convolution engine comprises a plurality of Mini Parallel Rolling Engines (MPREs) and Convolution Multiply and Accumulate Extended (CMAC-X). It is to be noted that the reconfigurable parallel 3-Dimensional (3-D) convolution engine may utilize existing available on-chip resources of at least Field Programmable Gate Arrays (FPGA) and Application Specific Integrated Circuits (ASIC). Example of the on-chip resources include, but not limited to, registers, Digital Signal Processing (DSP) chips, memory controllers, multipliers, multiplexers, and adders. The present invention focuses on the reconfigurable parallel 3-D convolution engine consists of a plurality of instances for performing row wise 2-D and 3-D convolutions on various kernel sizes and depths along with addressing handling the functional safety requirements to support Single Event Transition Upset (SEU) or Single Event Transition (SET) faults. Examples of the various kernel sized include, but not limited to, 3×3, 5×5, 7×7 and 9×9.

It may be noted that each MPRE further comprises a plurality of instances pertaining to the CMAC-X integrated with a localized memory space which enables easy data access for fast convolution and layer combining. It may be noted that the reconfigurable parallel 3-D convolution engine is a fully reconfigurable and an area efficient architecture with the functional safety mechanism to accommodate various kernel sizes, depth and suitable for FPGA or ASIC. The reconfigurable parallel 3-D convolution engine is more suitable for high throughput application such as datacenter applications or large networks for classification such as medical imaging.

While aspects of described system and method for performing the convolution operation on the image using the reconfigurable convolution engine and may be implemented in any number of different computing systems, environments, and/or configurations, the embodiments are described in the context of the following exemplary reconfigurable parallel 3-D convolution engine.

Referring now to FIG. 1, a hardware implementation of a reconfigurable parallel 3-Dimensional (3-D) convolution engine 100 in an infrastructure 1000 having one or more external components for performing 3-D Convolution and feature map extraction on an image is disclosed. The reconfigurable parallel 3-D convolution engine 100 (also referred as NOVA Core—Network Optimized Variable Architecture) may be implemented in a variety of computing systems, such as a laptop computer, a desktop computer, a notebook, a workstation, and a mainframe computer. The reconfigurable parallel 3-D convolution engine 100 may be configured to utilize on-chip resources of at least one of Field Programmable Gate Arrays (FPGA) and Application Specific Integrated Circuits (ASIC). The reconfigurable parallel 3-D convolution engine 100 may comprise a plurality of instances. Each instance of the reconfigurable parallel 3-D convolution engine 100 may comprise on-chip resources including, a first memory controller 104, a kernel memory space 112, one or more input line buffers, one or more output line buffers, and a flat dense computing unit 122.

Further, the one or more external components in the infrastructure 1000 may comprise a host processor 102, a host interface 103, a second memory controller 116, and a system controller 106. The host processor 102 may be a Central Processing Unit (CPU) installed in at least one of the variety of computing systems. To perform the 3-D convolution and feature map extraction on the image, the image is received from the host interface 103. The host processor 102 may enable the reconfigurable parallel 3-D convolution engine 100 to communicate with other computing devices, such as web servers and external data servers (not shown). The host processor 102 may facilitate multiple communications within a wide variety of networks and protocol types, including wired networks, for example, LAN, cable, etc., and wireless networks, such as WLAN, cellular, or satellite. The host interface 103 may be a bus interface configured to execute a protocol for data transfer between the host processor 102 and the reconfigurable parallel 3-D convolution engine 100. It is to be understood that a user may interact with the reconfigurable parallel 3-D convolution engine 100 via the host interface 103. The host interface 103 may include a variety of software and hardware interfaces, for example, a web interface, a graphical user interface, and the like. The host interface 103 may allow the reconfigurable parallel 3-D convolution engine 100 to interact with the user directly or through other client devices.

Further, the host interface 103 may include one or more ports for connecting a number of devices to one another or to another server. In an implementation, the host interface 103 may facilitate on-chip communication by implementing on-chip bus protocols including, but not limited to, Advanced Microcontroller Bus Architecture (AMBA) Advanced High-Performance bus (AHB) and Advanced Extensible Interface (AXI), Wishbone Bus, Open Core Protocol (OCP) and Core Connect Bus. In other implementation, the host interface 103 may facilitate off-chip communication by implementing off-chip bus protocols including, but not limited to, Universal Serial Bus (USB), Peripheral Component Interconnect Express (PCIe), and any other High speed interfaces.

The first memory controller 104 and the second memory controller 116, communicatively coupled with the host processor 102, may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The first memory controller 104 and the second memory controller 116 are further connected to the one or more input line buffers and the one or more output line buffers to fetch Input feature map data, stored in an input FMM cluster 108, from an external memory and transfer convoluted output data to an output FMM cluster 118 and thereby the external memory respectively.

The system controller 106 is connected to the host interface 103, the kernel memory space 112, the first memory controller 104, the second memory controller 116 and the reconfigurable parallel 3-D convolution engine 100.

In one aspect, the reconfigurable parallel 3-D convolution engine 100 may further comprise a plurality of instances of CNN reconfigurable engine 111-1, 111-2 . . . , 111-N (hereinafter referred to as CNN reconfigurable engine 111 throughout the specification) for performing 2D and 3D convolutions in parallel so as to handle multiple feature maps i.e. kernels. It is to be noted that each of the plurality of instances comprises a set of processors to multiply one or more features present in a feature map of the image. It may be noted that each of the CNN reconfigurable engine 111 comprises at least one Mini Parallel Rolling Engine (MPRE) 114 and at least one kernel memory space 112 that enable convolutions for various kernel sizes and depths such as 3×3, 5×5, 7×7 and 9×9. The MPRE 114 further comprises a plurality of instances of Convolution Multiply and Accumulate-Extended (CMAC-X) multiple instance configured to perform parallel row wise convolution operation on the feature map.

In one aspect, the feature map may indicate mapping of one or more features when found in the image. The result of multiplication may be stored in an accumulator. The accumulator may store one or more results pertaining to one or more multiplication operation of the one or more features. Finally, an adder may add the one or more results to provide a convoluted output for one layer. Similarly, a pipeline adder may add the convoluted output to provide convolution result of the image.

As described earlier, each CNN reconfigurable engine 111 comprises the at least one kernel memory space 112. It may be understood that the kernel memory space 112 acts as a local cache memory for holding the parameters associated to the network layer on which each instance of CNN reconfigurable engine 111 is presently working. The system controller 106 acts as configuration and control unit for the reconfigurable parallel 3-D convolution engine 100 and other functional blocks which is controlled by the host processor 102. The kernel memory space 112 may be configured to hold kernel values related to the convolution layer in operation. The one or more input line buffers may be configured to hold the image data for the convolution operation. The one or more output line buffers may be configured to receive the output of the reconfigurable parallel 3-D convolution engine 100 and buffer the output before passing to next stage of processing. In other words, both the one or more input line buffers and the one or more output line buffers hold single or multiple image/feature map data and the data to be handled by the memory controller 104 to be scheduled by the host processor 102.

According to the performance and power requirements, a plurality of instances of the reconfigurable parallel 3-D convolution engine 100 may be implemented to perform parallel feature map extraction. In each instance of the reconfigurable parallel 3-D convolution engine 100, a leaf level element is the CMAC-X which does convolution for different kernel size and performs layer combining when enabled. CMAC-X has internal local buffer for holding the image/feature map data and kernel data. The multiple data ports enable parallel data loading from the one or more input line buffers. In one aspect, a plurality of instances of the CMAC-X form the MPRE 114 which does parallel row wise convolution operation on a feature map.

The CMAC-X has configurable Functional Safety mechanism. This safety mechanism helps to overcome when there is a Single Event Upset (SEU) and Single Event Transition (SET) fault events may cause the functional failure.

All the necessary control signal for the CMAC-X may be provided by the "Local Controller" present in each instance of the MPRE 114.

Figure 2:
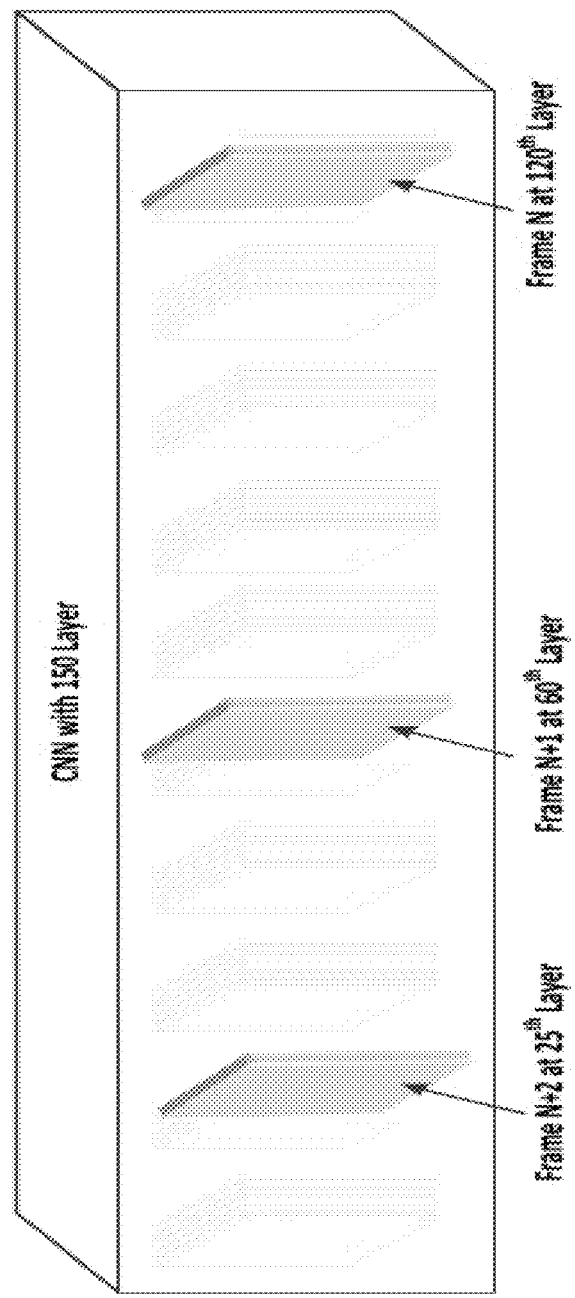
FIG. 2 illustrates an example indicating a sample of 150 CNN Layers with pipeline processing, in accordance with an embodiment of the present subject matter.

In one embodiment, Deep Networks with multiple layers and where the system performance requirement like frame rate is high, few CMAC-X can be freed-up once the intermediate layer computation is complete and can be grouped together, to work for the next input image frame, this is handled by scheduler. This will enable better utilization and throughput. In video applications, processing of subsequent frames may happen in the pipeline. FIG. 2 depicts a sample CNN with 150 layers and different input frames getting processed in pipeline.

In an exemplary embodiment, the CNN reconfigurable engine 111 is configured to perform the following tasks i.e. initially, the CNN reconfigurable engine 111 loads the input feature map data from the one or more input line buffers to one or more MPREs 114. Upon loading the Input feature map data, the CNN reconfigurable engine 111 further loads the filter kernels values to the one or more MPREs 114. Subsequent to the loading the filter kernels values into the one or more MPREs 114, the CNN reconfigurable engine 111 initiates the one or more MPREs 114 in order to attain convolution for a feature map. The CNN reconfigurable engine 111 may then transfers the convoluted output data, pertaining to the feature map, into the one or more output line buffers which further relay the convoluted output data to the external memory. After transferring the convoluted output data into the one or more output line buffers, the CNN reconfigurable engine 111 facilitates centralized control to CNN engine local controller for monitoring status of the one or more MPRE 114.

Figure 3:
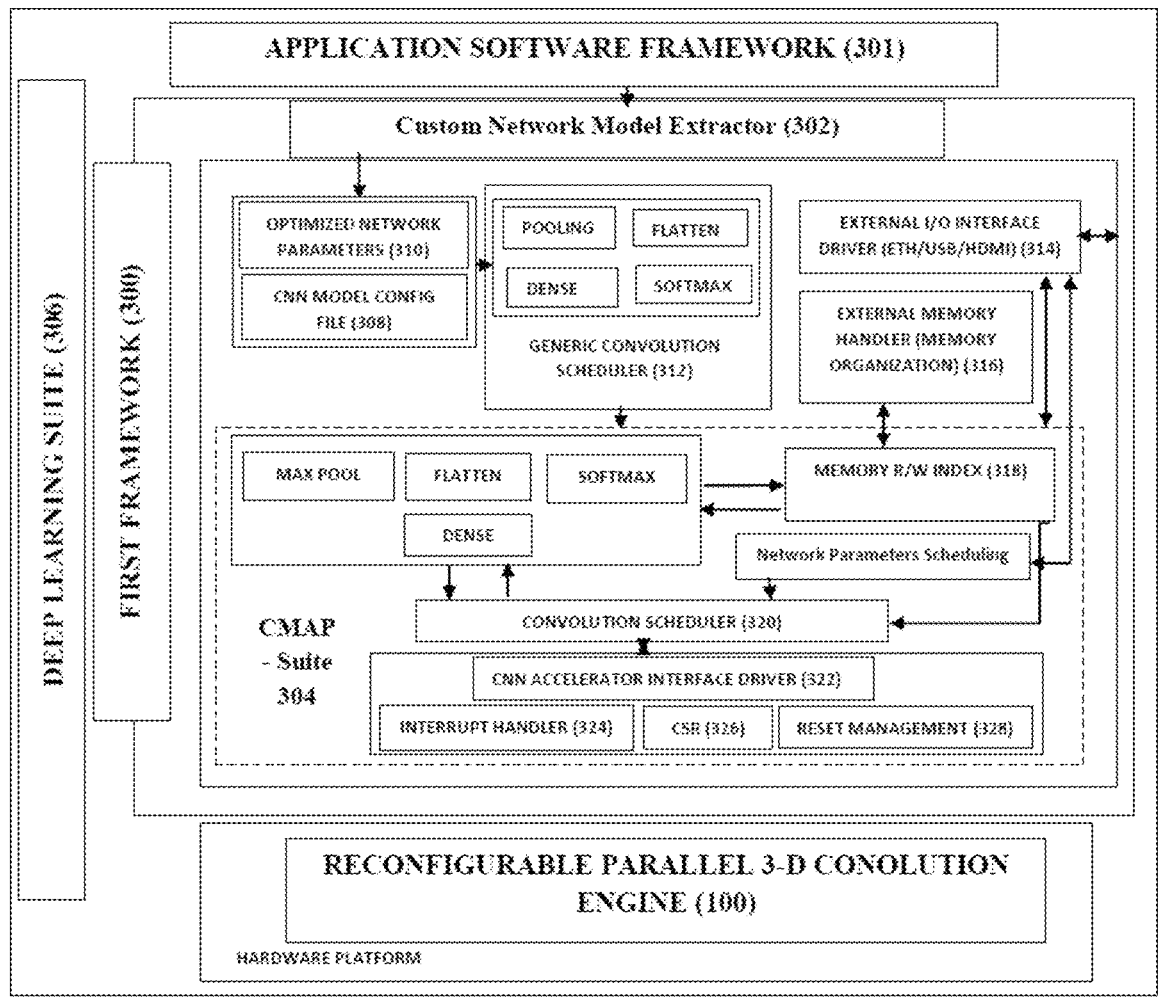
FIG. 3 illustrates an additional diagram showing a communication of a first framework with the reconfigurable parallel 3-Dimensional (3-D) convolution engine, in accordance with an embodiment of the present subject matter.

One of the applications of the reconfigurable parallel 3-Dimensional convolution engine 100 is more suitable for FPGA/ASIC technology. Custom software framework referred as first framework 300 shown in FIG. 3 is for SOC-FPGA. The first framework 300 helps to communicate with the reconfigurable parallel 3-D convolution engine 100. In one embodiment, the reconfigurable parallel 3-D convolution engine 100 may indicate a CNN accelerator.

Further, the first framework 300 basically consists of two custom software suites i.e. (1) Custom Network Model Extractor 302 and (2) CMAP-Suite 304.

It may be understood that the "first framework" 300 enables the user to interface with a Deep Learning application software i.e. a Deep Learning suite 306. Further, the Trained network model parameters from an application software framework 301 will be converted to a Target Optimized propriety model as a "CNN model Configuration file" 308 using the Custom Network Model Extractor 302, which is more suitable for the reconfigurable parallel 3-Dimensional convolution engine 100. In one embodiment, the Custom Network Model Extractor 302 extracts a set of network related parameters from the application software framework 301. The set of network related parameters may be available in the CNN model Configuration file 308 and a set of optimized network parameters 310.

The CMAP-Suite 304, on the other hand, handles the "CNN model Configuration file 308" generated from the Custom Network Model Extractor 302 and generates network specific scheduler during compile time. The CMAP Suite 304 in turn contains all necessary CNN layer function which can be utilized based on the network architecture. The built-in drivers, enables to configure/communicate with the reconfigurable parallel 3-Dimensional convolution engine 100 at run-time, which does the layer wise scheduling.

In addition to the aforementioned components, the CMAP-Suite 304 further comprises a generic convolution scheduler 312, an external I/O interface driver 314, an external memory handler 316, a memory R/W Index 318 for handling feature map, a convolution scheduler 320 communicatively coupled with a CNN accelerator interface driver 322, an interrupt handler 324, a CSR 326, a reset management 328. In one aspect, the generic convolution scheduler 312 utilizes the CNN model Configuration file 308 and performs layer wise scheduling using the convolution scheduler 320. This convolution scheduler 320 includes a plurality of CNN accelerator interface driver 322 and connects to the reconfigurable parallel 3-D convolution engine 100. The memory R/W Index 318 interfaces with the external memory handler 316 and facilitates fetching the feature map data from the external memory (such as DRAM). All the above components of the first framework 300 help to communicate with the reconfigurable parallel 3-D convolution engine 100.

One of working example indicating the optimized computations being performed using the reconfigurable parallel 3-Dimensional convolution engine 100 is shown below. Consider an example where image size=1280×960; stride=1; kernel size=3×3; depth=512 and number of input filter=1.

Assuming the clock speed of the reconfigurable convolution engine 100 as 100 MHz i.e. 10 ns, Number of filters=128, Number of input feature map=128, Number of output feature map=1, CNN reconfigurable engine 111 instances in operation=1, MPRE contains 1280 CMAC-X instances and Number of MPRE instances=96

To generate 1 intermediate feature map=9 cycles×10 ns=90 ns

There are 128 filters (assumed fully connected) to be layer combined=128×90 ns=11520 ns There is 1 BIAS and 1 RELU (activation function)=1 cycles×10 ns=10 ns TOTAL1=11620 ns Assumed, Data and Kernel Loading overhead=10% on top of TOTAL1=1162 ns TOTAL 1+10% overhead=TOTAL2=12782 ns Assumed, moving the computed feature map to O/P buffer overhead=25% on top of TOTAL2=3195 ns TOTAL 2+25% overhead=15977 ns=15.9 us i.e. Approx. 16 us Thus, by increasing the number of plurality of instances, effective time for execution of the convolution operation may be reduced.

In addition to the aforementioned components, the reconfigurable parallel 3-Dimensional convolution engine 100 may further comprise the flat dense compute unit 122 and a FMM organizer 120. The flat dense compute unit 122 is configured to convert each of the plurality of feature maps into 1-Dimensional vector and thereby perform dense multiplication on 1-Dimensional vector by using filter kernels values so as to transfer the convoluted output data to the external memory. The FMM organizer 120, on the other hand, is facilitates an intermediate feature map output data that may be cached in to FMM bank (110) for further processing by the subsequent network layers.

Exemplary embodiments discussed above may provide certain advantages. Though not required to practice aspects of the disclosure, these advantages may include those provided by the following features.

Some embodiments enable a system to perform Parallel 3-D Convolution processing of input feature map in all the layers.

Some embodiments enable centralized feature map memory cluster to hold the intermediate layer FMM bank in line wise segmented fashion, which reduces the external memory bandwidth and reduces host scheduling overhead.

Some embodiments enable and a method to perform 3-D convolution operations concurrently.

Some embodiments enable deeper networks with better utilization of on-chip hardware resources.

Some embodiments enable functional safety mechanism enables to address the functional safety failures like SEU/SET faults.

Some embodiments enable a system and a method to enhance processing power of the available on chip resources by concurrently performing convolution operations.

Some embodiments enable a system and a method to reuse same resource for one or more convolution layer.

Some embodiments enable a system and a method to reconfigure the convolution engine based on various kernel sizes.

Some embodiments enable a system and a method to increase throughput of the reconfigurable convolution engine by increasing an operating frequency of the reconfigurable convolution engine.

Some embodiments enable a system and a method to instantiate multiple parallel instances of reconfigurable 3-D convolution engine that may help in multiple input feature maps processing with different filter kernels.

Some embodiments enable a system and a method to deploy configurable MPRE to perform parallel row wise convolution on an image for different kernel size and image feature map with depth of any size.

Some embodiments enable a system and a method to store multiple network parameters helps reducing the external memory bandwidth and reduce HOST overhead based on Localized Kernel Memory space within each CNN reconfigurable engine.

Some embodiments enable parallel data loading from input line buffer and allows decentralized data interface to HOST for increased performance due to presence of multiple data ports and Local 110 router in each instance of CMAC-X.

CMAC-X with localized Data and Kernel buffer enables fast computation.

Although implementations for reconfigurable parallel 3-Dimensional (3-D) convolution cluster engine have been described in language specific to structural features and/or methods, it is to be understood that the appended claims are not necessarily limited to the specific features or methods described. Rather, the specific features and methods are disclosed as examples of implementations for reconfigurable parallel 3-D convolution cluster engine.

The invention claimed is:

1. A reconfigurable parallel 3-Dimensional (3D) convolution engine for performing 3D Convolution and feature map extraction on an image, the reconfigurable parallel 3D convolution engine comprising:
   a plurality of Convolution Neural Network (CNN) reconfigurable engines configured to perform 3D convolution, in parallel, to process a plurality of feature maps;
   a plurality of diagnostics registers configured to detect at least one Single Event Upset (SEU) faults and Single Event Transition (SET) faults while performing the 3D Convolution and feature map extraction on the image;
   a kernel memory space, present in each instance of CNN reconfigurable engine of the plurality of CNN reconfigurable engines, capable for holding a set of parameters associated to a network layer having each operational instance of the CNN reconfigurable engine of the plurality of CNN reconfigurable engines;
   at least one memory controller, an Input Feature Map Memory (FMM) cluster and an Output FMM cluster, wherein the at least one memory controller, in communication with each of the plurality of CNN reconfigurable engines, is configured to:
      fetch image data retrieved from an external memory,
      transfer the image data into one or more input line buffers, of each FMM bank, present in the Input FMM cluster, in order to extract the plurality of feature maps from the image data; and
      transfer convoluted output data, indicative of a 3D Convolution and feature map extraction of the image, to one or more output line buffers, of the Output FMM cluster, which further relay the convoluted output data to the external memory; and
   a flat dense computing unit configured to:
      convert each of the plurality of feature maps into 1-Dimensional vector; and
      perform dense multiplication on the 1-Dimensional vector by using filter kernels values so as to transfer the convoluted output data to the external memory.

2. The reconfigurable parallel 3D convolution engine as claimed in claim 1, wherein each CNN reconfigurable engine of the plurality of CNN reconfigurable engines further comprises a Mini Parallel Rolling Engine (MPRE) and a kernel memory space, and wherein each CNN reconfigurable engine of the plurality of CNN reconfigurable engines facilitates convolution for distinct size and depth pertaining to a kernel.

3. The reconfigurable parallel 3D convolution engine as claimed in claim 1, wherein each CNN reconfigurable engine of the plurality of CNN reconfigurable engines performs (3D) convolution by:
   loading input feature map data from the one or more input line buffers to one or more Mini Parallel Rolling Engine (MPRE),
   loading the filter kernels values to the one or more MPRE,
   initiating the one or more MPRE in order to attain convolution for a feature map of the plurality of feature maps,
   transferring the convoluted output data, pertaining to the feature map, into the one or more output line buffers which further relay the convoluted output data to the external memory, and
   facilitating centralized control to CNN Engine Local Controller for monitoring status of the one or more MPRE.

4. The reconfigurable parallel 3D convolution engine as claimed in claim 1, wherein each Mini Parallel Rolling Engine (MPRE) comprises a plurality of Convolution Multiply and Accumulate-Extended engine (CMAC-X), configured to perform parallel row wise convolution operation on a feature map of the plurality of feature maps.

5. The reconfigurable parallel 3D convolution engine as claimed in claim 1, wherein the reconfigurable parallel 3D convolution engine enables segmented feature map storage into an input buffer by using an FMM organizer facilitating access to each CNN reconfigurable engine, and wherein the FMM organizer is configured to cache output data pertaining to an intermediate feature map into an FMM bank for further processing by subsequent network layers.

6. The reconfigurable parallel 3D convolution engine as claimed in claim 1, wherein the one or more input line buffers and the one or more input line buffers output line buffer hold single or multiple image feature map data.

7. The reconfigurable parallel 3D convolution engine, as claimed in claim 1,
   wherein a first framework is configured to communicate with the reconfigurable parallel 3D engine,
   wherein the first framework comprises a Custom Network Model Extractor and a CNN model configuration file,
   wherein the Custom Network Model Extractor and the CNN model configuration file facilitate interfacing with an external deep learning software, wherein the first framework further comprises a CMAP-Suite to generate a network specific scheduler when used in Field Programmable Gate Array (FPGA) devices during compile time, wherein details pertaining to the network specific scheduler configuration are extracted from the CNN model configuration file, and wherein the CNN model configuration file generates a desired configuration of the reconfigurable parallel 3D convolution engine when used in Application Specific Integrated Circuits (ASIC).

8. The reconfigurable parallel 3D convolution engine, as claimed in claim 1, wherein the plurality of CNN reconfigurable engines are provided with a configurable option enabling a user to deploy the plurality of CNN reconfigurable engines for parallel feature map generation using multiple kernels.

9. The reconfigurable parallel 3D convolution engine, as claimed in claim 1, wherein the plurality of CNN reconfigurable engines are provided with a configurable option allowing a user to disable the plurality of CNN reconfigurable engines.

* * * * *